ved upon the screen. Shaft 18 is made of square
UNITED STATES PATENT OFFICE.

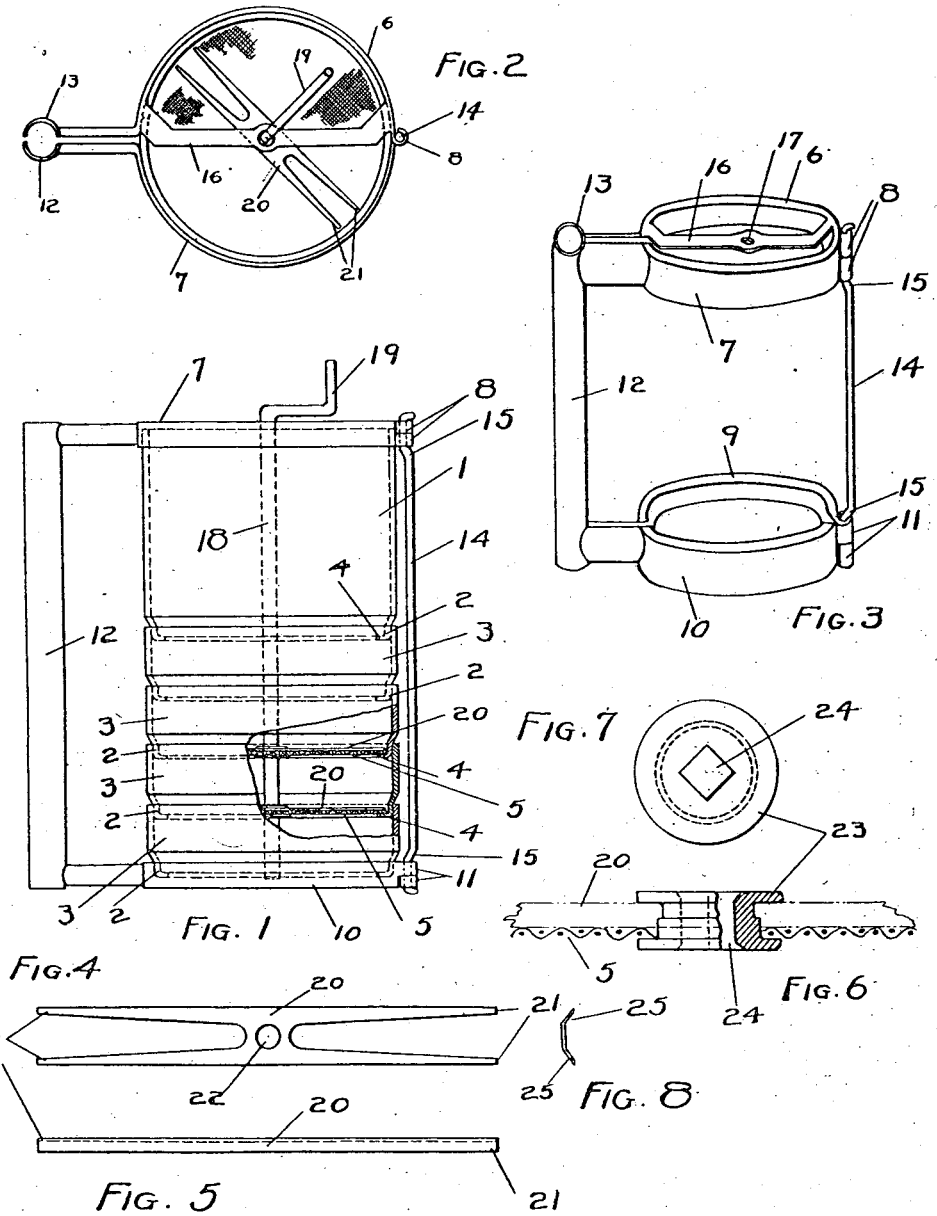

OTIS G. GRAHAM, OF PORTLAND, OREGON.

FLOUR-SIFTER.

1,170,893.  Specification of Letters Patent.  Patented Feb. 8, 1916.

Application filed April 7, 1915. Serial No. 19,697.

*To all whom it may concern:*

Be it known that I, OTIS G. GRAHAM, a citizen of the United States, residing at Portland, in the county of Multnomah and State of Oregon, have invented certain new and useful Improvements in Flour-Sifters, of which the following is a specification.

The object of my invention is to provide a sifter that will sift flour several times at one operation, that will be simple construction and economical manufacture.

I accomplish the above objects by means of the construction described in these specifications and illustrated in the accompanying drawings, which therefore become a part of this application for Letters Patent, and in which:—

Figure 1 is a side elevation of my invention, same being partially broken away to illustrate the construction. Fig. 2 is a plan view of my invention. Fig. 3 is a perspective view of the handle. Fig. 4 is a plan view of one of the agitator bars. Fig. 5 is a side elevation of one of the agitator bars. Fig. 6 is a detail, showing the connection of the agitator bar to the screen. Fig. 7 is a plan view of Fig. 6. Fig. 8 is an end elevation of Fig. 4.

Like characters of reference indicate like parts throughout the several views of the drawing, in which:—The numeral 1 is the body of the sifter, having at its lower end a lip 20 of slightly smaller diameter than the main body 1. A plurality of extensions 3 are provided, each extension having a lip 2 exactly similar to the lip 2 of the main body 1. Each of the several lips 2 have an inwardly turned annular portion 4, which annular portion 4 forms a rest for a screen 5, there being such a screen in the main body portion 1 and in each extension 3. A handle is provided, which comprises a pair of semi-circular bands 6 and 7 hinged together at 8, and a similar pair of semi-circular bands 9 and 10 hinged together at 11. The upper bands 6 and 7 are adapted to clasp about the body portion 1, and the lower bands 9 and 10 are adapted to clasp about the lower extension 3, as shown in Fig. 1. Integrally attached to semi-circular portions 7 and 10 is a handle 12, and integrally attached to semi-circular portions 6 and 9 is a handle 13. A hinge pin 14 is provided for the hinges 8 and 11, said hinge pin having shoulders 15 adapted to properly space the bands 6 and 7 from the bands 9 and 10. Band 6 has a chordal portion 16 having a central orifice 17 adapted to receive the operating shaft 18. Said shaft 18 is provided with a crank 19 for manual operation.

Secured to each screen 5, immediately above same, and in a manner free to rotate is an agitator 20, having bifurcated ends 21, and a central orifice 22. Each agitator is secured to its respective screen by means of an eyelet 23 having a squared orifice 24, said eyelet being securely riveted to the agitator, and also riveted to the screen in a manner to allow the agitator to freely rotate upon the screen. Shaft 18 is made of square material adapted to fit the square orifices in eyelets 23, and thus rotate all the agitators simultaneously when crank 19 is rotated. The bifurcated ends of agitators 20 are beveled as shown at 25 in Fig. 8 for the purpose of more thoroughly agitating the flour.

My invention may be made of any size and constructed of any material deemed convenient and suitable for a device of this character, and while I have illustrated and described a preferred construction and arrangement of parts deemed desirable in materializing my invention, I wish to include in this application for Letters Patent all mechanical equivalents or substitutes that may fairly be considered to come within the scope and purview of my invention, as defined in the appended claims.

Having thus fully described and illustrated my invention so that others skilled in the art to which it appertains may be enabled to construct and use the same, what I claim as new and desire to secure by Letters Patent, is:—

1. In a flour sifter having a plurality of interlocking members, each member forming a compartment wherein is mounted a screen, a plurality of agitators, each agitator being rotatably mounted upon one of said screens and having a central orifice therein adapted for the free passage of a shaft longitudinally therethrough, a shaft adapted to pass freely through the central orifices of said agitators, and means whereby the rotation of said shaft shall cause the simultaneous rotation of the agitators.

2. In a flour sifter, a plurality of screens adapted for the successive passage of flour therethrough, an agitator adjacent each of said screens, means to rotate said agitators comprising an eyelet rigidly attached to said agitator and rotatably attached to the adjacent screen, said eyelet having a polygonal orifice adapted to receive a polygonal shaft.

3. In a flour sifter having a plurality of interlocking members, each member forming a compartment wherein is mounted a screen, a handle comprising an upper pair of pivotally connected bands, a lower pair of pivotally connected bands, the corresponding bands of each pair being rigidly connected by a handle portion, said pairs of bands being adapted to infold the upper and lower of said interlocking members and clamp upon same when said handles are grasped.

4. A flour sifter comprising a plurality of interlocking members, each member forming a compartment, a plurality of screens, one of said screens being mounted in each of said compartments and said screens being adapted for the successive passage of flour therethrough, an agitator rotatably mounted upon each of said screens, a crank shaft adapted to engage each of said agitators and to rotate same when manually operated, and a handle adapted to simultaneously clamp the upper and lower of said interlocking members when said handle is grasped.

In witness whereof I claim the foregoing as my own, I hereunto affix my signature in the presence of two subscribing witnesses.

OTIS G. GRAHAM.

Witnesses:
DAVID E. LOFGREN,
C. S. BROWN.